(12) United States Patent
Kim et al.

(10) Patent No.: US 9,924,480 B2
(45) Date of Patent: Mar. 20, 2018

(54) APPARATUS AND METHOD FOR CALIBRATING DELAY BETWEEN SIGNAL PATHS

(71) Applicant: Samsung Electronics Co., Ltd., Gyeonggi-do (KR)

(72) Inventors: Sooyong Kim, Gyeonggi-do (KR); Junghwan Son, Seoul (KR); Junghoon Lee, Gyeonggi-do (KR); Intae Kang, Seoul (KR); Chaehag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/216,320

(22) Filed: Jul. 21, 2016

(65) Prior Publication Data

US 2017/0026925 A1 Jan. 26, 2017

(30) Foreign Application Priority Data

Jul. 24, 2015 (KR) .................. 10-2015-0105114
Mar. 25, 2016 (KR) .................. 10-2016-0036116

(51) Int. Cl.
| H04W 24/08 | (2009.01) |
| H04W 56/00 | (2009.01) |
| H04B 17/13 | (2015.01) |
| H04B 1/04 | (2006.01) |

(52) U.S. Cl.
CPC ........ *H04W 56/0015* (2013.01); *H04B 17/13* (2015.01); *H04B 2001/045* (2013.01); *H04W 24/08* (2013.01)

(58) Field of Classification Search
CPC .. H04L 1/242; H04W 24/08; H04W 56/0015; H04B 2001/045; H04B 17/13
See application file for complete search history.

(56) References Cited

U.S. PATENT DOCUMENTS

| 7,522,676 | B2 | 4/2009 | Matero |
| 8,605,774 | B2 | 12/2013 | Rupp et al. |
| 8,718,579 | B2 | 5/2014 | Drogi |
| 8,737,940 | B1 | 5/2014 | Langer et al. |
| 8,824,981 | B2 | 9/2014 | Langer et al. |
| 8,854,129 | B2 | 10/2014 | Wilson |

(Continued)

FOREIGN PATENT DOCUMENTS

| KR | 1020140108167 | 9/2014 |
| KR | 1020140121868 | 10/2014 |

(Continued)

*Primary Examiner* — Sophia Vlahos
(74) *Attorney, Agent, or Firm* — The Farrell Law Firm, P.C.

(57) ABSTRACT

Methods and apparatuses are provided in which a first terminal determines a delay offset value based on a first delay value of a first channel between the first terminal and an entity, and a second delay value of a second channel between the first terminal and the entity. The delay offset value is transmitted from the first terminal, to a second terminal. The second terminal uses the delay offset value to determine a third delay value of a third channel between the second terminal and the entity based on a fourth delay value of a fourth channel between the second terminal and the entity, the fourth delay value being determined by the second terminal.

20 Claims, 18 Drawing Sheets

(56) References Cited

U.S. PATENT DOCUMENTS

| | | |
|---|---|---|
| 8,873,677 B1 | 10/2014 | Loh et al. |
| 8,908,797 B2 | 12/2014 | Jeckeln |
| 8,928,403 B2 | 1/2015 | Bartram |
| 2008/0205439 A1* | 8/2008 | Li .................... H04L 25/03878 370/465 |
| 2009/0097591 A1 | 4/2009 | Kim |
| 2010/0151886 A1* | 6/2010 | Swope ................. H04W 64/00 455/456.5 |
| 2012/0147941 A1* | 6/2012 | Su ....................... H02H 1/0061 375/224 |
| 2012/0258752 A1* | 10/2012 | Liao ..................... H04W 56/00 455/509 |
| 2012/0302174 A1* | 11/2012 | Watanabe ......... H04W 56/0065 455/67.11 |
| 2013/0034139 A1 | 2/2013 | Khlat et al. |
| 2013/0076418 A1 | 3/2013 | Belitzer et al. |
| 2013/0207731 A1 | 8/2013 | Balteanu |
| 2013/0231069 A1 | 9/2013 | Drogi |

FOREIGN PATENT DOCUMENTS

| | | |
|---|---|---|
| KR | 1020150040787 | 4/2015 |
| WO | WO 2014/033661 | 3/2014 |

* cited by examiner

APPARATUS AND METHOD FOR CALIBRATING DELAY BETWEEN SIGNAL PATHS

PRIORITY

This application claims priority under 35 U.S.C. § 119(a) to Korean Application Serial Nos. 10-2015-0105114 and 10-2016-0036116, which were filed in the Korean Intellectual Property Office on Jul. 24, 2015, and Mar. 25, 2016, respectively, the contents of which are incorporated herein by reference.

BACKGROUND

1. Field of the Disclosure

The present disclosure relates generally to a wireless communication system, and more particularly, to a method and an apparatus for calibrating a delay between signal paths.

2. Description of Related Art

For terminals that use envelope tracking (ET), there has been an increased importance for the measurement of a delay value between a processing time of a signal of a main block and a processing time of a signal of an ET block.

SUMMARY

An aspect of the present disclosure provides an apparatus and a method in which a terminal shares a measured offset value, and thus, another terminal is capable of efficiently calibrating a delay between two signal paths.

According to an aspect of the present disclosure, an operation method of a first terminal is provided. The first terminal determines a delay offset value based on a first delay value of a first channel between the first terminal and an entity, and a second delay value of a second channel between the first terminal and the entity. The delay offset value is transmitted from the first terminal, to a second terminal. The second terminal uses the delay offset value to determine a third delay value of a third channel between the second terminal and the entity based on a fourth delay value of a fourth channel between the second terminal and the entity, the fourth delay value being determined by the second terminal.

According to another aspect of the present disclosure, an operation method of a first terminal is provided. The first terminal determines a first delay value of a first channel between the first terminal and an entity. A delay offset value is received at the first terminal, from a second terminal. A second delay value of a second channel between the first terminal and the entity is determined based on the delay offset value and the first delay value. The delay offset value is determined based on a third delay value of a third channel between the second terminal and the entity and a fourth delay value of a fourth channel between the second terminal and the entity.

According to another aspect of the present disclosure, a terminal apparatus is provided that includes a controller configured to determine a delay offset value based on a first delay value of a first channel between the first terminal and an entity, and a second delay value of a second channel between the first terminal and the entity, and to transmit the delay offset value to a second terminal. The second terminal uses the delay offset value to determine a third delay value of a third channel between the second terminal and the entity based on a fourth delay value of a fourth channel between the second terminal and the entity, the fourth delay value begin determined by the second terminal.

According to another aspect of the present disclosure, a terminal apparatus is provided that includes a controller configured to determine a first delay value of a first channel between the terminal and an entity, receive a delay offset value from a second terminal, and determine a second delay value of a second channel between the terminal and the entity based on the delay offset value and the first delay value. The delay offset value is determined based on a third delay value of a third channel between the second terminal and the entity and a fourth delay value of a fourth channel between the second terminal and the entity.

According to another aspect of the present disclosure, a method is provided for calibrating a delay between signal paths at a first terminal. A controller of the first terminal determines a first delay value of a first channel of the first terminal. The controller determines a second delay value of a second channel of the first terminal. The controller determines a difference between the first delay value and the second delay value as a delay offset value. A transmitter of the first terminal transmits the delay offset value, to a second terminal. The second terminal combines the delay offset value with a third delay value of a third channel of the second terminal to determine a fourth delay value of a fourth channel of the second terminal.

According to another aspect of the present disclosure, a method is provided for calibrating a delay between signal paths at a first terminal. A controller of the first terminal determines a first delay value of a first channel of the first terminal. A receiver of the first terminal receives a delay offset value, from a second terminal. The first delay value and the delay offset value are combined to determine a second delay value of a second channel of the first terminal. The delay offset value is a difference between a third delay value of a third channel of the second terminal and a fourth delay value of a fourth channel of the second terminal.

According to another aspect of the present disclosure, a terminal is provided that includes a controller configured to determine a first delay value of a first channel of the terminal, determine a second delay value of a second channel of the terminal, and determine a difference between the first delay value and the second delay value as a delay offset value. The terminal also includes a transmitter configured to transmit the delay offset value to a second terminal. The second terminal combines the delay offset value with a third delay value of a third channel of the second terminal to determine a fourth delay value of a fourth channel of the second terminal.

According to another aspect of the present disclosure, a terminal is provided that includes a receiver configured to receive a delay offset value from a second terminal. The terminal also includes a controller configured to determine a first delay value of a first channel of the terminal, and combine the first delay value and the delay offset value to determine a second delay value of a second channel of the terminal. The delay offset value is a difference between a third delay value of a third channel of the second terminal and a fourth delay value of a fourth channel of the second terminal.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1A:
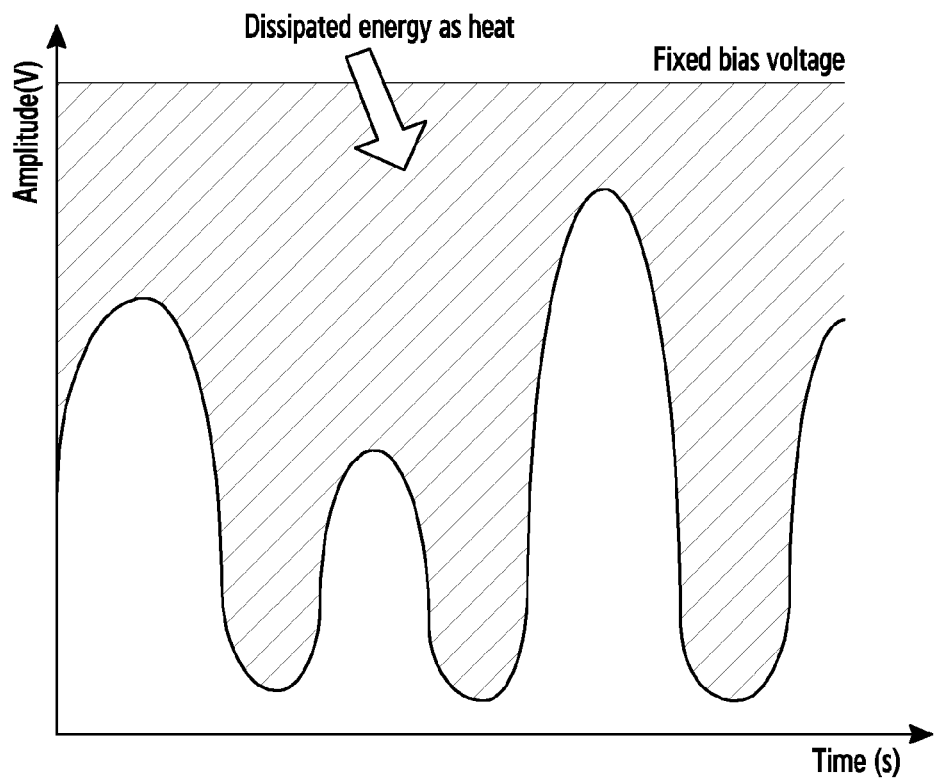
FIGS. 1A and 1B are diagrams illustrating ET.

Embodiments of the present disclosure are described in detail with reference to the accompanying drawings. The same or similar components may be designated by similar reference numerals although they are illustrated in different drawings. Detailed descriptions of constructions or processes known in the art may be omitted to avoid obscuring the subject matter of the present disclosure.

Terms used herein are defined based on functions in various embodiments, but may vary according to the intention or convention of a user or operator. Therefore, the definitions of the terms should be made based on the content provided herein.

Hereinafter, the present disclosure describes the calibration of a delay between two signal paths by sharing an offset value.

The terminology that is used herein to indicate each entity (e.g., a terminal, another terminal, a database, and a server), and a functional configuration of each entity (e.g., a controller, a storage unit, a modem, a radio frequency front end control interface (RFFE), a signal processing unit, an offset identifying unit, and an envelope tracking unit), and the like are used for ease of description. Therefore, the present disclosure is not limited by the terminologies used herein, and other terms that have equivalent technical meanings may also be used.

Figure 1B:
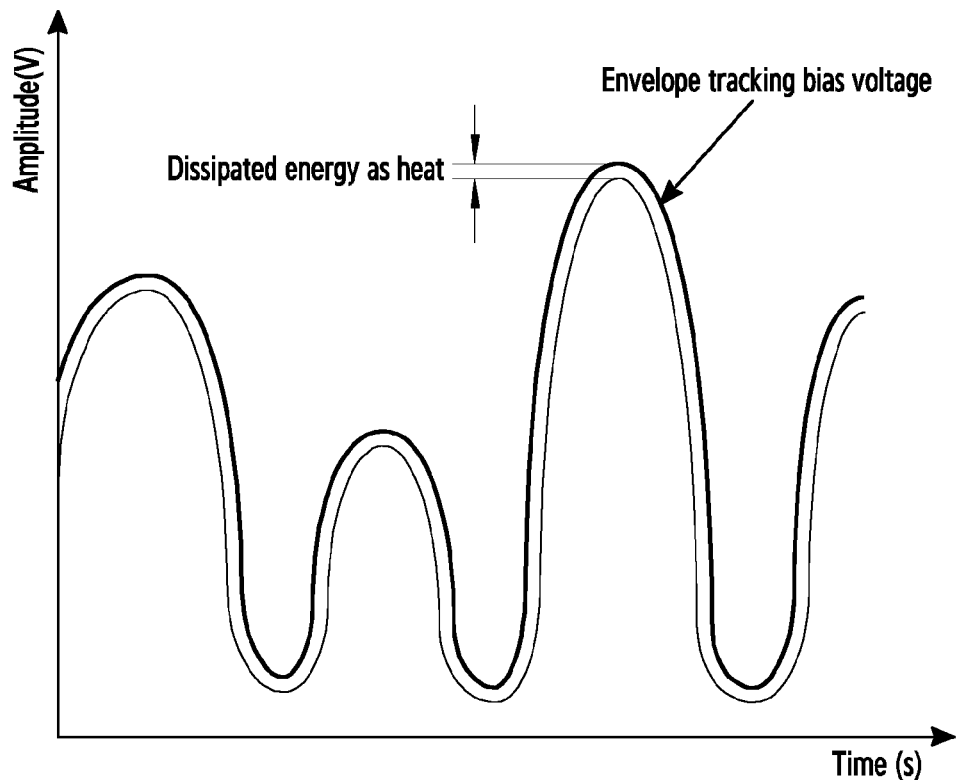

FIGS. 1A and 1B are diagrams illustrating an ET.

Referring to FIG. 1A, the horizontal axis of a graph of FIG. 1A indicates time variation and is expressed in units of seconds (s). The vertical axis of the graph indicates the amplitude of a voltage and is expressed in units of volts (V). The graph includes a curve indicating a change in the magnitude of an input signal of a power amplifier over time, and includes a line indicating the amplitude of a voltage supplied from the power amplifier over time.

The graph indicates a relationship between an input signal that is variably input into the power amplifier over time and a supply voltage that is supplied in response to the input signal. In the graph, the magnitude of the input signal changes over time, but the amplitude of the supply voltage that is supplied in response to the input signal has a constant value, irrespective of time. Therefore, the supply voltage is provided irrespective of the magnitude of the input signal, and thus, unnecessary power consumption occurs. The unnecessary power consumption may cause a terminal to consume battery power.

Referring to FIG. 1B, the horizontal axis of the graph in FIG. 1B indicates time variation and is expressed in units of seconds (s). The vertical axis of the graph indicates the amplitude of a voltage and is expressed in units of volts (V). The graph includes a curve indicating a change in magnitude of an input signal of a power amplifier over time, and includes a curve indicating a change in amplitude of a voltage supplied from the power amplifier over time.

The graph indicates a relationship between an input signal that is variably input into the power amplifier over time and a supply voltage that is provided in response to the input signal. In the graph, the magnitude of the input signal changes over time, but the amplitude of the supply voltage that is supplied from the power amplifier of an ET system in response to the input signal may change based on the change in the magnitude of the input signal. Therefore, the supply voltage is supplied based on the magnitude of the input signal, and thus, the power amplifier of the ET system may cause efficient power consumption.

The power amplifier of the ET system may need to perform time synchronization between an envelope signal that controls the magnitude of a supply voltage of the power amplifier and a baseband signal that is input into the power amplifier. When the time synchronization is not performed, a signal output from the power amplifier may be distorted. That is, adjacent channel leakage ratio (ACLR) performance may be decreased. The ACLR indicates a difference value between the magnitude of power of a signal output from a predetermined channel and the magnitude of power of a signal output from an adjacent channel that is a predetermined offset frequency distant from the predetermined channel. That is, when the signal output from the predetermined channel insignificantly affects the signal output from the adjacent channel (i.e., when a signal power of the predetermined channel that flows into the adjacent channel is low), it may indicate that the ACLR performance is high. However, when the signal output from the predetermined channel significantly affects the signal output from the adjacent channel (i.e., when a signal power of the predetermined channel that flows into the adjacent channel is high), it may indicate that the ACLR performance is low.

An apparatus and a method are provided for calibrating a delay between a signal path for processing a signal input into a power amplifier (hereinafter, a first signal path) and a signal path for controlling an envelope signal (hereinafter, a second signal path). A delay value between the first signal path and the second signal path may be different based on a band, a bandwidth, and a channel of each of a plurality of terminals. When each of the plurality of terminals individually measures a delay value between two signal paths with respect to a plurality of combinations of a plurality of bands, a plurality of channels, and a plurality of bandwidths, it will take a large amount of time to measure the delay value. Also, when a delay value between two signal paths with respect to one terminal out of a plurality of terminals is equally applied to other terminals, delay measurement values with respect to the other terminals may generate incorrect results due to different delay characteristics (that is, different bands, bandwidths, and channel characteristics), and thus, the incorrect results may cause a deterioration of the ACLR performance.

Hereinafter, a method and an apparatus are provided for measuring delay values of other terminals by using a two-signal-path delay offset value, which is measured by one terminal. The phrases "delay value" and "delay value between two signal paths" indicate a difference between a signal processing time value of a first signal path and a signal processing time value of a second signal path, in association with a single band, a single channel, and a single bandwidth. The phrase "delay offset value" indicates a difference of a delay value between each channel (or each bandwidth) with respect to a single terminal. Hereinafter, a terminal is described that generates a two-signal-path delay offset value, and transmits the generated delay offset value, as a "terminal" or as a "representative terminal". As described herein, the phrase "another terminal" is a terminal that receives the transmitted delay offset value, and measures a delay value of another channel (or another bandwidth) by applying the received delay offset value.

Figure 2:
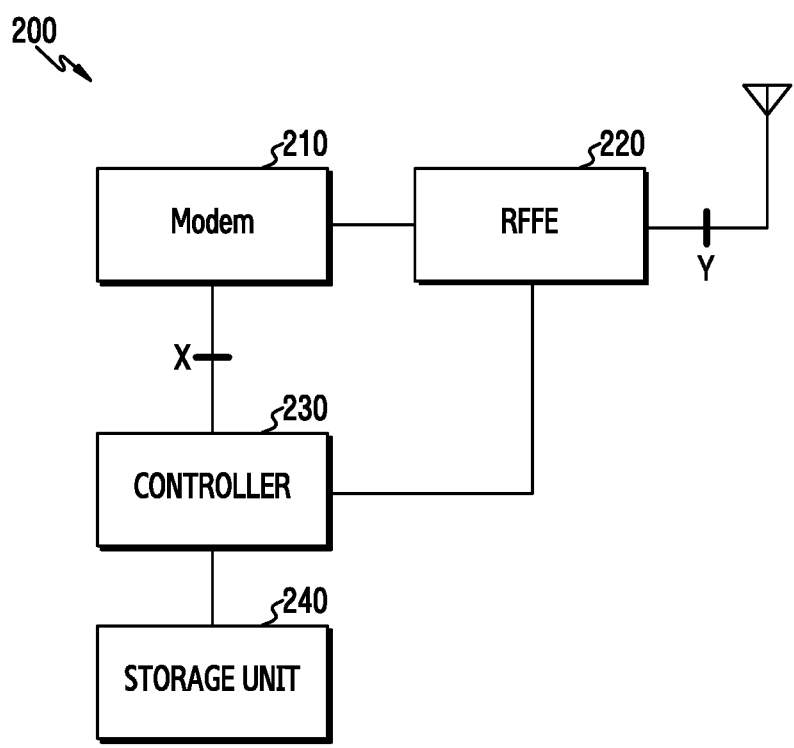
FIG. 2 is a block diagram illustrating a terminal, according to an embodiment of the present disclosure.

FIG. 2 is a block diagram illustrating a terminal, according to an embodiment of the present disclosure. Hereinafter, terms such as "unit", and terms ending in "-er" and "-or" indicate a unit that processes at least one function or operation, which may indicate hardware, software, or a combination thereof.

Referring to FIG. 2, a terminal 200 may be a portable electronic device having a radio access function, such as, for example, a smart phone. For example, the terminal 200 may be embodied as one of a portable terminal, a mobile phone, a mobile pad, a tablet computer, a handheld computer, and a personal digital assistant (PDA). As another example, the terminal 200 may be embodied as a media device, such as a media player, a camera, a speaker, and a smart television, which are wirelessly accessible. As another example, the terminal 200 may be embodied as a wearable electronic device, such as a smart watch, smart glasses, and the like. As another example, the terminal 200 may be embodied as a point of sales (POS) device or a beacon device. As another example, the terminal 200 may be embodied as a device that includes two or more functions of the above described devices.

The terminal 200 includes a modem 210, an RFFE 220, a controller 230, a storage unit 240, and an antenna. Although the terminal of FIG. 2 is only shown to include the above-described components, components may be changed based on various embodying methods. For example, the terminal 200 may further include a speaker, a camera, a sensor, a microphone, a touch screen, a keypad, and the like. Also, although FIG. 2 illustrates that each component is formed as a single element, each component may be formed of two or more elements based on various embodying methods. For example, when the terminal 200 supports multiple input multiple output (MIMO) technology, the antenna illustrated in FIG. 2 may be two or more antennas.

The modem 210 and the RFFE 220 perform a function of processing a transmission signal. The modem 210 and the RFFE 220 include the first signal path. The modem 210 and the RFFE 220 may process a transmission signal through the first signal path.

The modem 210 may perform various operations to process a transmission signal in a baseband. According to an embodiment of the present disclosure, the modem 210 may perform modulation based on a modulation scheme associated with a communication system. For example, the modem 210 may perform modulation based on code division multiple access (CDMA), wideband CDMA (WCDMA), an orthogonal scheme (e.g., orthogonal frequency division multiplexing (OFDM)), a non-orthogonal scheme (e.g., filter bank multi-carrier (FBMC)), and the like.

According to other embodiments of the present disclosure, the modem 210 may generate a plurality of transmission signals. The plurality of transmission signals may be transmitted respectively through different carriers. The plurality of transmission signals are respectively transmitted through different channels. Also, the plurality of transmission signals may respectively have different gains or different transmission powers based on the communication environment.

The RFFE 220 may perform various operations to transmit a transmission signal processed in the modem 210 as a radio frequency (RF) signal. According to an embodiment of the present disclosure, the RFFE 220 may filter, based on a transmission band, an RF signal that is processed from the modem 210, and is converted by a digital-analog converter (DAC) into an analog signal. For example, the RFFE 220 may filter the RF signal based on whether the transmission signal corresponds to a high band (HB), a middle band (MB), or a low band (LB).

According to other embodiments of the present disclosure, the RFFE 220 may up-convert the RF signal. The signal power of the up-converted RF signal may be amplified by a power amplifier (PA). The amplified RF signal may be transmitted through an antenna that is functionally connected to the RFFE 220.

Although not illustrated in FIG. 2, the terminal 200 may perform an operation of receiving a signal. When the terminal 200 is capable of receiving a signal, the terminal 200 may further include components (e.g., a receiver or the like) to receive a signal. For example, when the terminal 200 is "another terminal", as described in greater detail below, the terminal 200 may receive the transmission signal through an antenna, and may down-convert and filter the received signal. Also, the terminal 200 may demodulate the received signal based on a modulation scheme.

The controller 230 may include a single processor core (single core) or may include multiple processor cores. For example, the controller 230 may include a multi-core, such as a dual-core, a quad-core, a hexa-core, and the like. According to an embodiment of the present disclosure, the controller 230 may further include a cache memory that is located inside or outside of the controller 230.

The controller 230 may be functionally coupled with other components to perform various functions of the terminal 200. According to an embodiment of the present disclosure, the controller 230 may control the modem 210 and the RFFE 220 to process a transmission signal. For example, the controller 230 may control an operation for processing an envelope signal with respect to the transmission signal. In another example, the controller 230 may measure the duration time values of the first signal path and the second signal path. Also, the controller 230 may determine a delay value between two signal paths, based on the measured duration time values of the first signal path and the second signal path.

According to another embodiment, the controller 230 may store, read, or load a received signal or data in/from the storage unit 240. For example, the controller 230 may measure duration time values of the first signal path and the second signal path, and may store the same in the storage unit 240. Also, the controller 230 may identify a delay value between two signal paths based on the measured duration time values of the first signal path and the second signal path, and may store the identified delay value in the storage unit 240.

The storage unit 240 may include at least one of a volatile memory and a non-volatile memory. The non-volatile memory may include a read only memory (ROM), a programmable ROM (PROM), an electrically programmable ROM (EPROM), an electrically erasable ROM (EEPROM), a flash memory, a phase-change random access memory (RAM) (PRAM), a magnetic RAM (MRAM), a resistive RAM (RRAM), a ferroelectric RAM (FRAM), and the like. The volatile memory may include at least one of a dynamic RAM (DRAM), a static RAM (SRAM), a synchronous DRAM (SDRAM), a PRAM, a MRAM, a RRAM, a FRAM, and the like. The storage unit 240 may include a non-volatile media, such as, for example, a hard disk drive (HDD), a solid state disk (SSD), an embedded multimedia card (eMMC), and a universal flash storage (UFS).

A point X and a point Y, illustrated in FIG. 2, indicate points where a signal is obtained to measure a duration time value in each of the first signal path and the second signal path. For example, the point X indicates a point where an input signal of the first signal path is captured. The point Y indicates a point where an output signal of the first signal path is captured. In another example, the point X indicates a point where an input signal of the second signal path is captured, and the point Y indicates a point where an output signal of the second signal path is captured. The terminal 200 may determine the duration time values of the first signal path and the second signal path by calculating a cross-correlation of the captured signals. The terminal 200 may identify a delay value between two signal paths based on the duration time value of the first signal path and the duration time value of the second signal path. The terminal 200 performs envelope tracking by calibrating the identified delay value, and the power amplifier included in the terminal 200 may amplify a transmission signal based on the envelope tracking.

As described above, a delay value, which is used for calibrating a delay between two signal paths, may generate a different result based on a band, a bandwidth, and a channel of each terminal. When each of a plurality of terminals individually measures a delay value between two signal paths with respect to a plurality of combinations of a plurality of bands, a plurality of bandwidths, and a plurality of channels, a large amount of time is required to measure the delay value. Also, when a delay value measured between two signal paths with respect to one terminal (e.g., a representative terminal) out of a plurality of terminals is equally applied to other terminals, delay values with respect to other terminals may generate incorrect results due to different delay characteristics, and the incorrect result may cause a deterioration of the ACLR performance. Therefore, embodiments of the present disclosure provide a method and an apparatus for measuring a delay value between two signal paths of other terminals using a two-signal-path delay offset value that is measured by a representative terminal.

Figure 3:
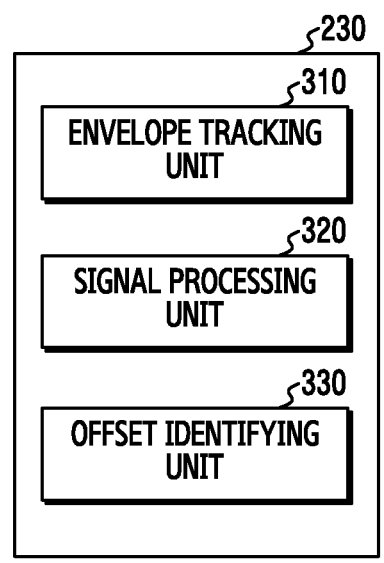
FIG. 3 is a block diagram illustrating a controller, according to an embodiment of the present disclosure.

FIG. 3 is a block diagram illustrating a controller, according to an embodiment of the present disclosure. The functional components described below may be included in the controller 230 of FIG. 2, or may be disposed outside the controller 230 and may independently perform operations.

Referring to FIG. 3, the controller 230 includes an envelope tracking unit 310, a signal processing unit 320, and an offset identifying unit 330. Although the controller 230 of FIG. 3 is shown to include only the above-described components, components may be added depending on an embodying method, and the components may operate through coupling.

The signal processing unit 320 may perform a series of operations for processing a transmission signal. The signal processing unit 320 may perform a signal processing process according to the first signal path. Also, the signal processing unit 320 may control the functions of the modem 210 and the RFFE 220 of FIG. 2.

The envelope tracking unit 310 may perform a series of operations for processing an envelope signal. The envelope tracking unit 310 may perform a signal processing process according to the second signal path. The envelope signal indicates a voltage value supplied from a power amplifier in response to the transmission signal that changes over time. The envelope tracking unit 310 may include various configurations based on an embodying method. For example, the envelope tracking unit 310 may include a fractional delay finite impulse response (FIR) filter, an ET gain1, a shape function, an ET gain2, an ET bulk delay, and a supply modulation (SM). The fractional delay FIR filter may adjust a fractional delay (e.g., a unit of 0.25 ns) in the second signal path. The ET gain1 may adjust a delayed signal gain of the second signal path through the fractional delay FIR filter. The shape function may modify a signal of the second signal path of which the gain is adjusted, so as to output an appropriate bias signal to the power amplifier. The ET gain2 may adjust a gain of the modified signal. The ET gain2 may perform substantially the same function as the ET gain1, but the ET gain2 may properly adjust a gain based on various purposes by taking into consideration an output signal of the shape function. The ET bulk delay may adjust a bulk delay of a signal of the second signal path, of which the gain is adjusted. The SM may supply an appropriate bias voltage to the power amplifier based on the signal with the bulk delay.

The offset identifying unit 330 may determine a delay offset value by identifying a delay value between two signal paths in a predetermined channel (or bandwidth), and by identifying a delay value between the two signal paths measured in another channel (or bandwidth), according to an embodiment of the present disclosure. Although the delay value between two signal paths is described as being identified by the offset identifying unit 330, the delay value may be identified by other components. For example, the duration time value of the first signal path is measured by the envelope tracking unit 310, the duration time value of the second signal path is measured by the signal processing unit 320, and the delay value between two signal paths is identified by another component included in the controller 230. In another example, the duration time value of the first signal path and the duration time value of the second signal path, and the delay value between two signal paths, may be identified by another component included in the controller 230.

The offset identifying unit 330 may identify the delay value between two signal paths according to various methods. For example, the offset identifying unit 330 may identify a delay value between two signal paths by calculating a cross-correlation between the duration time value of the first signal path and the duration time value of the second signal path. In another example, the offset identifying unit 330 may identify the delay value between two signal paths by measuring an ACLR. In another example, the offset identifying unit 330 may identify the delay value between two signal paths by combining the cross-correlation calculation and the ACLR measurement. The detailed operations of the offset identifying unit 330 are described in greater detail below with reference to FIGS. 4A and 4B.

The offset identifying unit 330 may perform different functions based on whether the terminal 200 is a representative terminal. For example, when the terminal 200 is a representative terminal that provides a two-signal-path delay offset value of each channel, the offset identifying unit 330 may identify a delay value between two signal paths with respect to each channel (or bandwidth), and may identify a delay offset value based on a delay value identified for each channel (or bandwidth). In another example, when the terminal 200 is "another terminal" that identifies another delay value of each channel (or bandwidth) by applying the delay offset value, the offset identifying unit 330 may store information of the delay offset value received from the representative terminal in a storage unit (e.g., the storage unit 240 of FIG. 2 or a storage unit that is separately included in the controller 230 of FIG. 2).

Figure 4A:
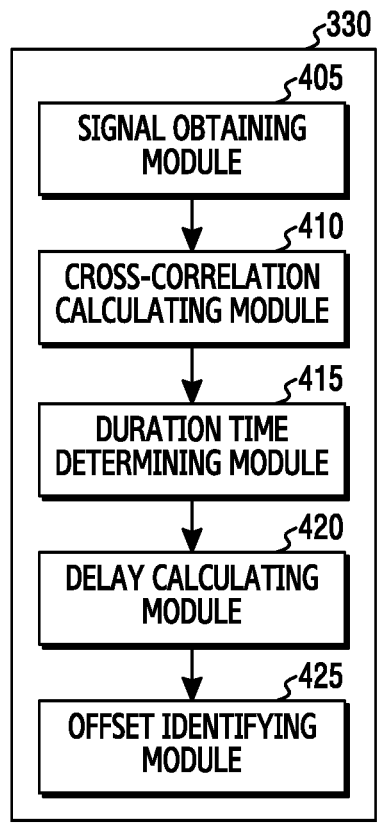
FIG. 4A is a block diagram illustrating an offset identifying unit, according to an embodiment of the present disclosure.

FIG. 4A is a block diagram illustrating an offset identifying unit, according to an embodiment of the present disclosure, and illustrates identifying a delay offset value using the calculation of a cross-correlation.

Referring to FIG. 4A, the offset identifying unit 330 of FIG. 3 identifies a delay offset value using the calculation of a cross-correlation. The offset identifying unit 330 includes a signal obtaining module 405, a cross-correlation calculating module 410, a duration time determining module 415, a delay calculating module 420, and an offset identifying module 425.

The signal obtaining module 405 may capture an input signal from the point X and an output signal from the point Y, illustrated in FIG. 2. Specifically, the signal obtaining module 405 may capture an input signal of the first signal path (i.e., a signal that passes the point X) and an output signal of the first signal path (i.e., a signal that passes the point Y), so as to measure a duration time value of the first signal path. Also, the signal obtaining module 405 may capture an input signal of the second signal path (i.e., another signal that passes the point X) and an output signal of the second signal path (i.e., another signal that passes the point Y), so as to measure a duration time value of the second signal path.

The cross-correlation calculating module 410 may calculate a cross-correlation with respect to the obtained input signal and output signal of each signal path. The cross-correlation calculating module 410 may transfer a calculation result value to the duration time determining module 415.

The duration time determining module 415 may determine the duration time value of each signal path based on the received cross-correlation calculation result value of each signal path. That is, the duration time determining module 415 may determine a duration time in which an envelope signal is processed in the first signal path and a duration time in which a transmission signal is processed in the second signal path.

The delay calculating module 420 may identifying a delay value between two signal paths based on the determined duration time values of the two signal paths. That is, the delay calculating module 420 may determine a difference between the duration time value of the first signal path and the duration time value of the second signal path as the delay value between the two signal paths. When the terminal 200 is a "representative terminal" that provides a delay offset value, the delay calculating module 420 may identify a plurality of delay values that respectively correspond to a plurality of channels in a single band and a plurality of bandwidths. When the terminal 200 is "another terminal" that uses the delay offset value, the delay calculating module 420 may identify only a delay value associated with a predetermined channel (hereinafter referred to as a 'reference channel) and a predetermined bandwidth (hereinafter referred to as a 'reference bandwidth') of the other terminal.

The offset identifying module 425 may identify a delay offset value based on a plurality of delay values that respectively correspond to a plurality of channels or a plurality of bandwidths. For example, when the terminal 200 is a "representative terminal", the offset identifying module 425 may identify a delay value between two signal paths in a reference channel, and may identify a delay value with respect to another channel excluding the reference channel. The offset identifying module 425 may identify the difference between the delay value of the reference channel and the delay value of the other channel as the delay offset value. In another example, when the terminal 200 is "another terminal", the offset identifying module 425 may receive a delay offset value identified by the representative terminal, and may use the received delay offset value.

Although FIG. 4A illustrates that the delay offset is identified through a single continuous process, the processes may be performed in parallel, according to embodiments of the present disclosure. For example, the process of measuring the duration time of the first signal path and the process of measuring the duration time of the second signal path may be performed in parallel. In another example, the process of measuring the duration time of the first signal path and the process of measuring the duration time of the second signal path may be performed in a reverse order.

Figure 4B:
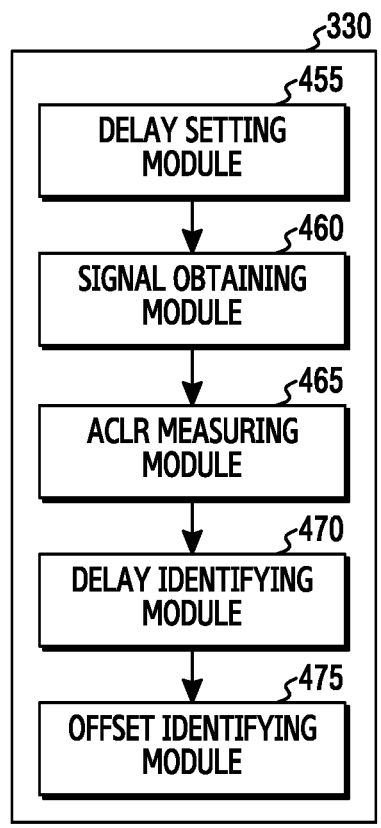
FIG. 4B is a block diagram illustrating an offset identifying unit, according to another embodiment of the present disclosure.

FIG. 4B is a block diagram illustrating an offset identifying unit, according to another embodiment of the present disclosure, and illustrates identifying a delay offset value using an ACLR.

Referring to FIG. 4B, the offset identifying unit 330 of FIG. 3 may identify a delay offset value by measuring an ACLR. The offset identifying unit 330 includes a delay setting module 455, a signal obtaining module 460, an ACLR measuring module 465, a delay identifying module 470, and an offset identifying module 475.

The delay setting module 455 may calibrate a delay value between two signal paths within a permitted delay range. For example, the delay setting module 455 may calibrate a delay between the first signal path and the second signal path based on a unit of 0.25 ns. The delay setting module 455 may apply a plurality of candidate delay values to obtain the maximum ACLR. That is, a delay value, where the maximum ACLR is measured, may be identified using ACLRs that are determined by applying the plurality of candidate delay values.

The signal obtaining module 460 may capture a plurality of output signals that are generated from a power amplifier, and of which delays are calibrated based on the plurality of candidate delay values. That is, the signal obtaining module 460 may capture the magnitude of power of each of the plurality of output signals so as to measure a plurality of ACLRs that respectively correspond to the plurality of candidate delay values.

The ACLR measuring module 465 may identify a plurality of ACLRs by using the plurality of output signals. For example, the ACLR measuring module 465 may measure an ACLR by using a difference between a power of an output signal that is measured in the reference channel and a power of an output signal in an adjacent channel that is distanced from the reference channel by a predetermined offset frequency.

The delay identifying module 470 may identify a delay value that has the maximum ACLR performance out of the measured ACLRs. Here, the maximum ACLR performance occurs when the smallest amount of power leaks into the adjacent channel. The delay identifying module 470 may identify a delay value that is calibrated to have the maximum ACLR performance out of the plurality of candidate delay values. When the terminal 200 is a "representative terminal" that provides a delay offset value, the delay identifying module 470 may identify a plurality of delay values that respectively correspond to a plurality of channels in a plurality of bands and a plurality of bandwidths. When the terminal 200 is "another terminal" that uses the delay offset value, the delay identifying module 470 may identify only a delay value associated with a reference channel and a reference bandwidth of the other terminal.

The offset identifying module 475 may identify a delay offset value based on a plurality of delay values that respectively correspond to a plurality of channels or a plurality of bandwidths. For example, when the terminal 200 is a "representative terminal", the offset identifying module 475 may identify a delay value between two signal paths in a reference channel, and may identify a delay value with respect to another channel excluding the reference channel. The offset identifying module 475 may identify a difference between the delayed value of the reference channel and the delay value of the other channel as the delay offset value. In another example, when the terminal 200 is "another terminal", the offset identifying module 475 may receive the delay offset value identified by the representative terminal, and may use the received delay offset value.

Measuring a delay value by calculating a cross-correlation of two signals may capture input/output signals of each of two signal paths, and may calculate a cross-correlation of the captured signals. Conversely, a measuring method using an ACLR may individually apply a plurality of candidate delay values so as to search for a delay value having an optimal ACLR performance. Therefore, the delay value measurement using the cross-correlation calculation may be quickly performed when compared to the delay value measurement using the ACLR. However, the measurement method using the ACLR may be more accurate when compared to the measurement method using the cross-correlation calculation. Therefore, the offset identifying unit 330 may select one of the two measurement methods, and may identify a delay value by combining the two measurement methods.

Figure 5:
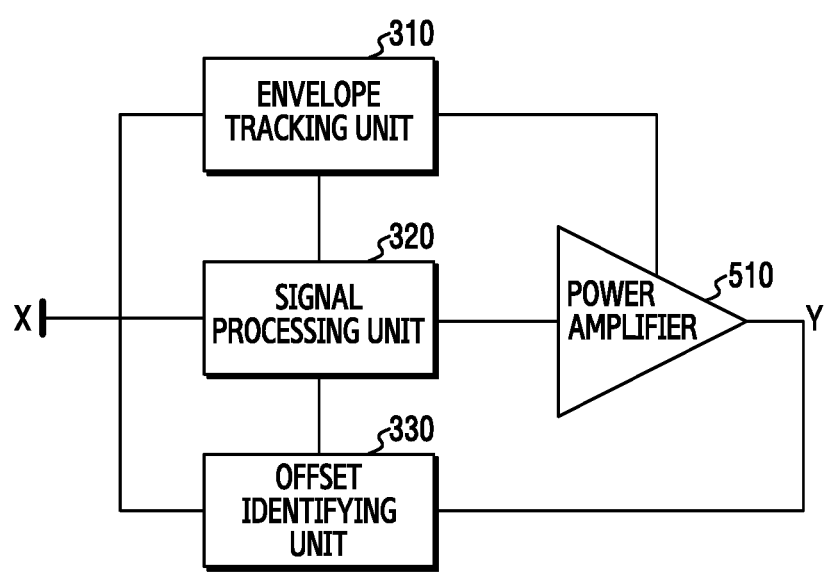
FIG. 5 is a diagram illustrating a configuration of hardware (H/W) of a terminal, according to an embodiment of the present disclosure.

FIG. 5 is a diagram illustrating a configuration of the hardware of a terminal, according to an embodiment of the present disclosure.

FIG. 5 illustrates a hardware configuration of the envelope tracking unit 310, the signal processing unit 320, and the offset identifying unit 330, which may include additional components. For example, the controller 230 of FIG. 2 may be added based on an embodiment of the present disclosure. Additionally or alternatively, a plurality of controllers 230 may be included in the envelope tracking unit 310, the signal processing unit 320, and the offset identifying unit 330, or the envelope tracking unit 310, the signal processing unit 320, and the offset identifying unit 330 may be included in the controller 230. In another example, the storage unit 240 of FIG. 2 may be separately added. Also, a plurality of storage units 240 may be included in the envelope tracking unit 310, the signal processing unit 320, and the offset identifying unit 330.

Referring to FIG. 5, the signal processing unit 320 may correspond to a functional configuration block of a first signal path, and may process a signal input to be fed into a power amplifier 510. The envelope tracking unit 310 may correspond to a functional configuration block of a second signal path, and may process an envelope signal corresponding to the input signal. The offset identifying unit 330 may measure a delay value between two signal paths as described above, and may identify a delay offset value based on a delay value of a reference channel. The power amplifier 510 amplifies a signal input into the power amplifier 510 based on a delay value calibrated through the above described process, and transmits the amplified signal through at least one antenna.

An operation for identifying a delay value between two signal paths with respect to a plurality of channels or a plurality of bandwidths is described in detail below. A long term evolution (LTE) system may be separated based on a plurality of bands and a plurality of channels as shown in Table 1 below.

TABLE 1

| E-UTRA band | $F_{DL\_Low}$ (MHz) | $N_{DL\_Offset}$ | downlink EARFCN $(N_{DL})$ | $F_{UL\_Low}$ (MHz) | $N_{UL\_Offset}$ | uplink EARFCN $(N_{UL})$ |
|---|---|---|---|---|---|---|
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |

Referring to Table 1, the LTE system includes 14 evolved universal terrestrial radio access (E-UTRA) bands. Each E-UTRA band may include a plurality of uplink (UL) or downlink (DL) EUTRA absolute radio frequency channel numbers (EARFCNs). The EARFCN indicates each UL or DL channel number. F indicates a center frequency of each band. For example, band 1 includes EARFCNs 0 to 599 (600 EARFCNs) in DL. Also, the center frequency of EARFCN 0 is 2110 MHz. As the EARFCN increases by 1, the center frequency increases by 100 KHz. In another example, band 2 includes EARFCNs 18600 to 19199 (600 EARFCNs) in UL. Also, the center frequency of EARFCN 18600 is 1850 MHz. Although not illustrated in Table 1, the LTE system may use a channel bandwidth, such as 1.4 MHz, 3 MHz, 5 MHz, 10 MHz, 15 MHz, 20 MHz, and the like.

Each of a plurality of terminals may measure a delay value between a first signal path and a second signal path with respect to a plurality of signals that respectively correspond to a plurality of combinations of a plurality of channels (EARFCNs) in at least one E-UTRA band and a plurality of channel bandwidths. Operations of identifying a delay value between two signal paths with respect to a determined reference channel out of a plurality of EARFCNs and a plurality of channel bandwidths, and identifying a delay value between two signal paths that correspond to another channel and another bandwidth based on the delay value of the determined reference channel and a delay offset value associated with the other channel and the other bandwidth, are described in detail below.

Figure 6:
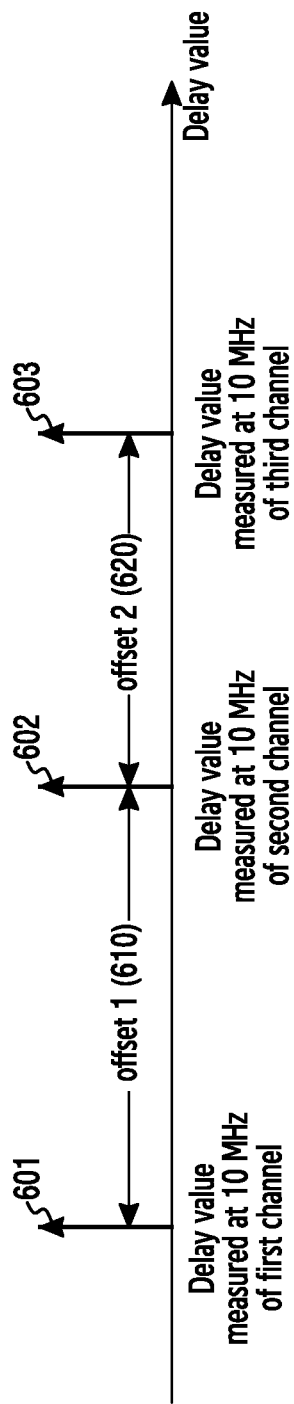
FIG. 6 is a diagram illustrating an operation of a terminal to determine a delay value between two signal paths and a delay offset value, according to an embodiment of the present disclosure.

FIG. 6 is a diagram illustrating an operation of a terminal to identify a delay value between two signals and a delay offset value, according to an embodiment of the present disclosure, and illustrates the operations of a representative terminal that provides the delay offset value.

Referring to FIG. 6, the representative terminal measures delay values of signals that respectively correspond to three different channels and a bandwidth of 10 MHz. The three channels may be included in a single band, or may be respectively included in different bands. The first, second, and third channels are merely designated names, and may not always indicate an EARFCN number listed in Table 1. For example, when the three channels are included in a single band, the first channel is the lowest channel in the band, the second channel is a medium channel in the band, and the third channel is the highest channel in the band.

The representative terminal measures a first delay value 601 of a signal with respect to the 10 MHz bandwidth of the first channel, measures a second delay value 602 of a signal with respect to the 10 MHz bandwidth of the second channel, and measures a third delay value 603 of a signal with respect to the 10 MHz bandwidth of the third channel.

According to an embodiment of the present disclosure, the representative terminal may determine the second channel as a reference channel. Various methods may be used to determine the reference channel. For example, the representative terminal may determine, as the reference channel, a channel that has the lowest delay value, which is used for calibrating a delay between the two signal paths. In another example, a channel that has the smallest distribution of a plurality of delay values, which are used for calibrating a delay between the two signal paths with respect to a plurality of terminals, may be determined as the reference channel.

The representative terminal may identify delay offset values, based on a difference between the delay value in the reference channel, and a delay value of each of the other channels. For example, as illustrated in FIG. 6, the representative terminal identifies a first delay offset value 610 based on the difference between the second delay value 602 and first the delay value 601. Additionally, as illustrated in FIG. 6, the representative terminal identifies a second delay offset value 620 based on the difference between the second delay value 602 and the third delay value 603. The first delay offset value 610 and the second delay offset value 620 are stored in a storage unit included in the representative terminal. The first delay offset value 610 and the second delay offset value 620 may be transmitted to a plurality of other terminals. As described below, the transmitted delay offset values may be used when the plurality of other terminals identify delay values of signals corresponding to a plurality of channels and a plurality of bandwidths.

Figure 7A:
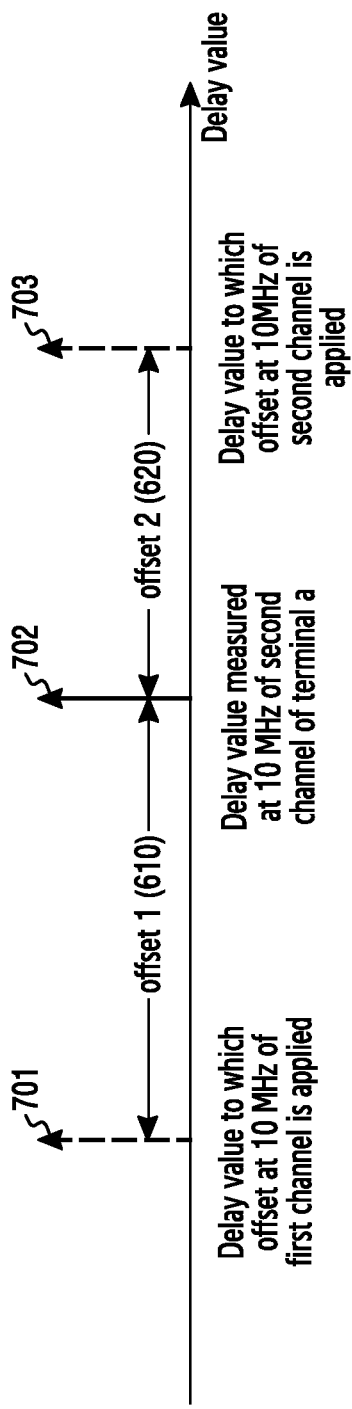
FIGS. 7A and 7B are diagrams illustrating an operation of another terminal to determine a delay value between two signal paths, according to an embodiment of the present disclosure.
Figure 7B:
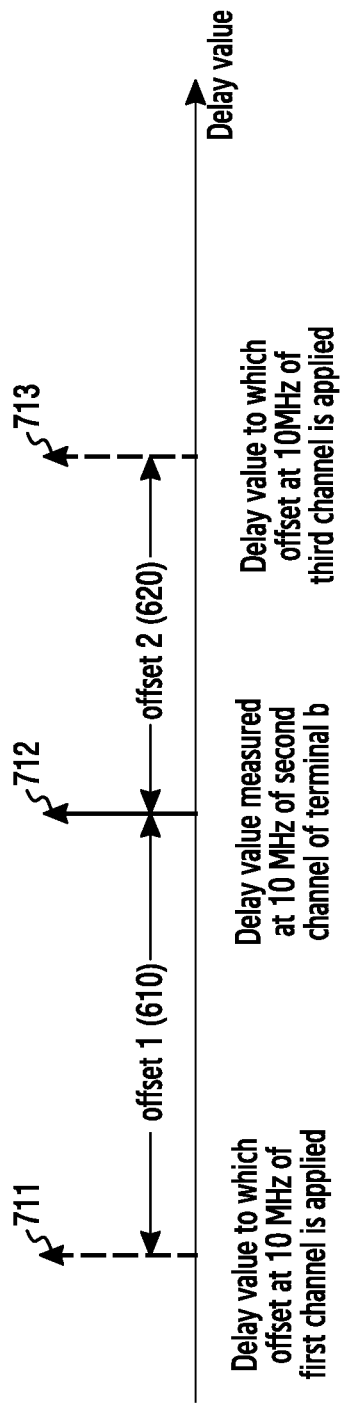

FIGS. 7A and 7B are diagrams illustrating an operation of another terminal to identify a delay value between two signal paths, according to an embodiment of the present disclosure, and illustrate the operations of other terminals that measure a delay value between two signal paths using the delay offset value.

Referring to FIG. 7A, a terminal A (i.e., one of the plurality of other terminals) measures a second delay value 702 between two signal paths with respect to the 10 MHz bandwidth of the second channel, which corresponds to a reference channel. Unlike the operations of the representative terminal of FIG. 6, the terminal A may not need to separately measure a first delay value 701 between two signal paths with respect to the 10 MHz bandwidth of the first channel, and a third delay value between two signal paths with respect to the 10 MHz bandwidth of the third channel. The terminal A may determine the first delay value 701 and the third delay value 703 based on the first delay offset value 610 and the second delay offset value 620 that are received from the representative terminal. For example, the terminal A may identify the first delay value 701 by applying the first delay offset value 610 to the second delay value 702. Additionally, the terminal A may identify the third delay value 703 by applying the second delay offset value 620 to the second delay value 702.

FIG. 7B is a diagram illustrating an operation in which a terminal measures a delay value between two signal paths, according to an embodiment of the present disclosure. A terminal B identifies a first delay value 711 and a third delay value 713 by applying, to a second delay value 712 measured by the terminal B, the first delay offset value 610 and the second delay offset value 620 that are received from the representative terminal.

The delay offset value that is obtained from the reference channel and is applied to each channel may be equally applied to the plurality of other terminals. However, delay values of the reference channel measured by the plurality of other terminals are different from each other, and thus, the delay values of the other channels may generate different results. Accordingly, the operation method may reduce the amount of time expended when the terminals measure delay values with respect to a plurality of channels, and may calculate a more accurate delay value by reflecting different delay characteristics of the terminals.

Figure 8:
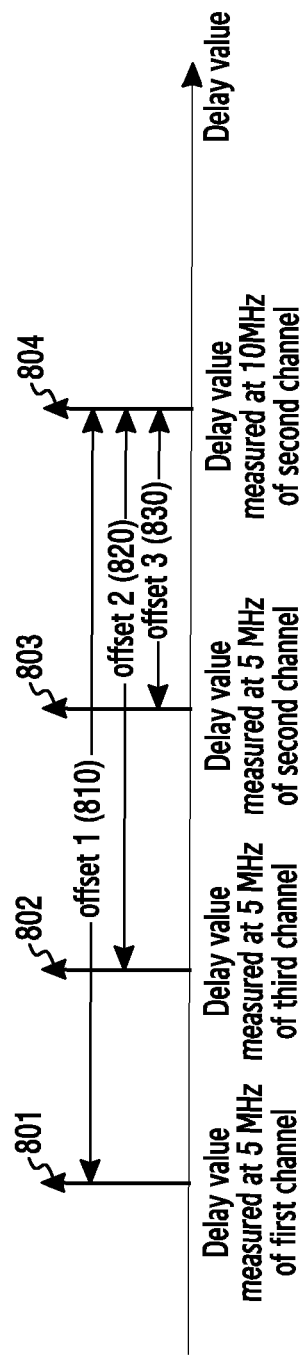
FIG. 8 is a diagram illustrating an operation of a terminal to determine a delay value between two signal paths and a delay offset value, according to another embodiment of the present disclosure.

FIG. 8 is a diagram illustrating an operation of a terminal to identify a delay value between two signal paths and a delay offset value, according to another embodiment of the present disclosure, and illustrates the operations of a representative terminal that provides the delay offset value.

Referring to FIG. 8, the representative terminal may measure delay values of signals that respectively correspond to three different channels and a bandwidth of 5 MHz and a bandwidth of 10 MHz. The three channels may be included in a single band, or may be respectively included in different bands. The first, second, and third channels are merely their designated names, and may not always indicate an EARFCN number listed in Table 1. For example, when the three channels are included in a single band, the first channel is the lowest channel in the band, the second channel is a medium channel in the band, and the third channel is the highest channel in the band.

The representative terminal measures a first delay value 801 of a signal with respect to the 5 MHz bandwidth of the first channel, a second delay value 802 of a signal with respect to the 5 MHz bandwidth of the third channel, a third delay value 803 of a signal with respect to the 5 MHz bandwidth of the second channel, and a fourth delay value 804 of a signal with respect to the 10 MHz bandwidth of the second channel.

According to an embodiment of the present disclosure, the representative terminal may determine the second channel having a bandwidth of 10 MHz, as a reference channel. The representative terminal identifies delay offset values, based on a difference between the delay value in the reference channel and a delay value of each of other channels. For example, as illustrated in FIG. 8, the representative terminal identifies a first delay offset value 810 based on the difference between the fourth delay value 804 and the first delay value 801. The representative terminal identifies a second delay offset value 820 based on the difference between the fourth delay value 804 and the second delay value 802. The representative terminal identifies a third delay offset value 830 based on the difference between the fourth delay value 804 and the third delay value 803.

Figure 9A:
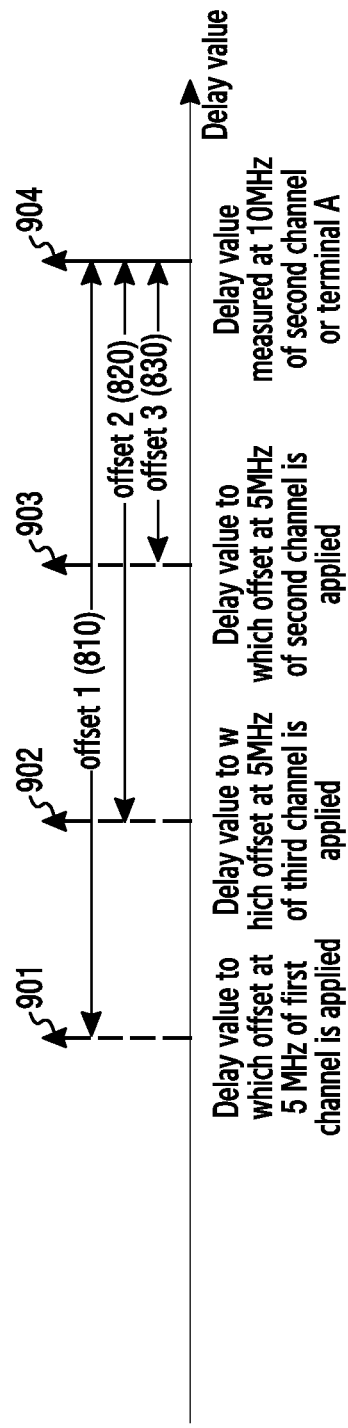
FIGS. 9A and 9B are diagrams illustrating an operation of another terminal to determine a delay value between two signal paths, according to another embodiment of the present disclosure.
Figure 9B:
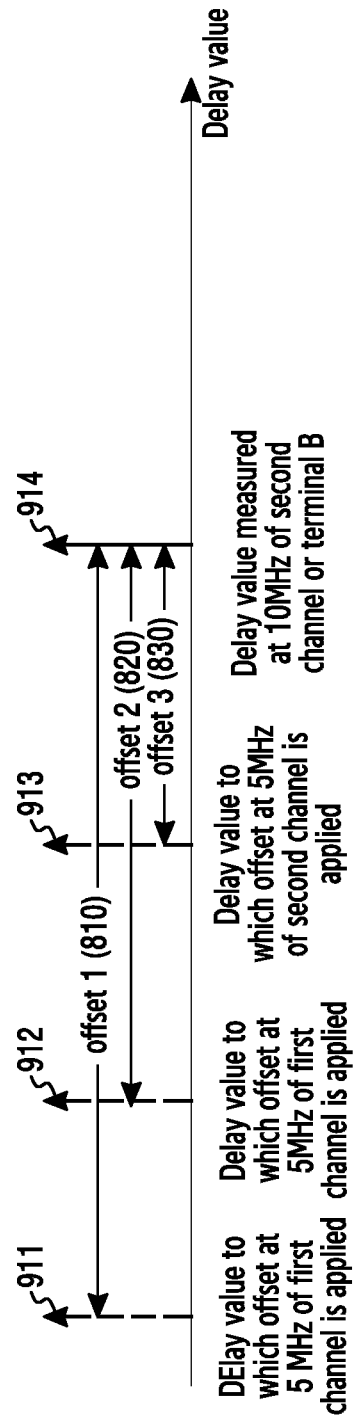

FIGS. 9A and 9B are diagrams illustrating the operation of another terminal to identify a delay value between two signal paths, according to another embodiment of the present disclosure. FIGS. 9A and 9B illustrate the operations of other terminals that measure a delay value between two signal paths using the delay offset value.

Referring to FIG. 9A, a terminal A (i.e., one of the plurality of other terminals) measures a fourth delay value between two signal paths with respect to the 10 MHz bandwidth of the second channel, which corresponds to a reference channel. Unlike the operations of the representative terminal of FIG. 8, the terminal A does not need to separately measure a first delay value between two signal paths with respect to the 5 MHz bandwidth of the first channel, a second delay value between two signal paths with respect to the 5 MHz bandwidth of the third channel, and a third delay value between two signal paths with respect to the 5 MHz bandwidth of the second channel. The terminal A determines the first delay value 901, the second delay value 902, and the third delay value 903 based on the first delay offset value 810, the second delay offset value 820, and the third delay offset value 830 that are received from the representative terminal Referring to FIG. 9B, the terminal B (i.e., one of the other terminals, excluding the terminal A), determines a first delay value 911, a second delay value 912, and a third delay value 913, based on a fourth delay value 914 measured by the terminal B, and using the first delay offset value 810, the second delay offset value 820, and third the delay offset value 830 that are received from the representative terminal.

Figure 10A:
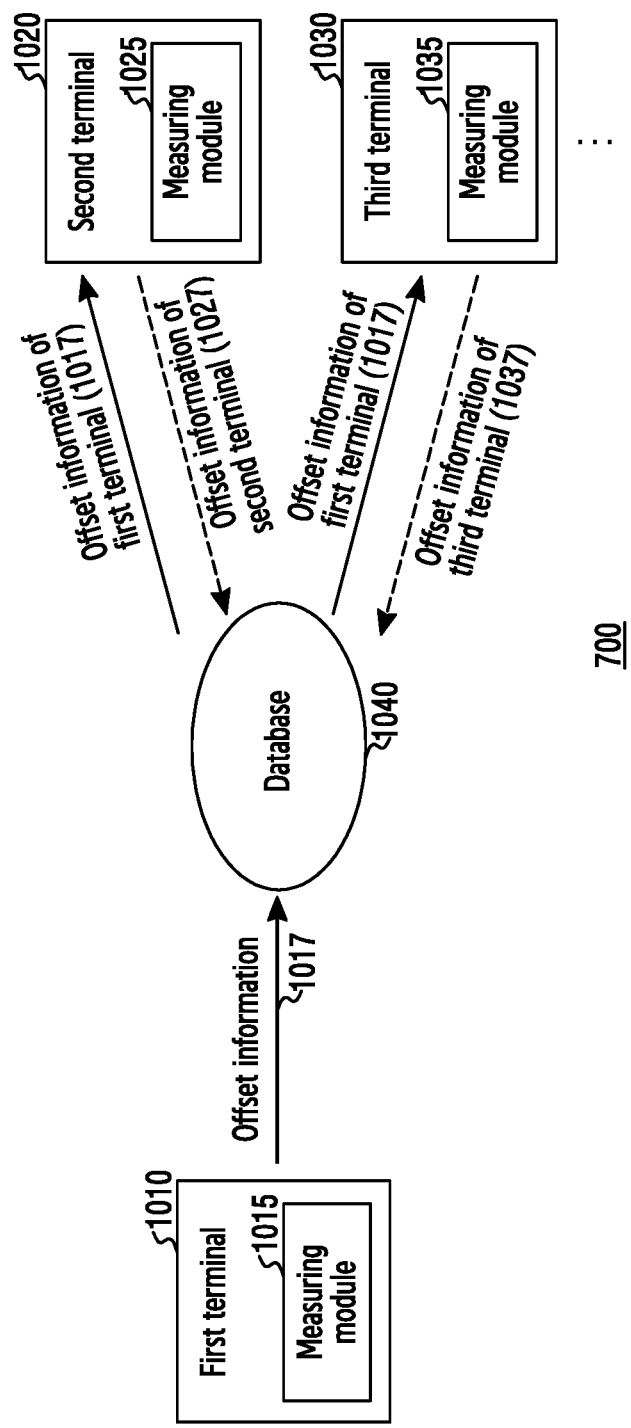
FIG. 10A is a diagram illustrating an operation of sharing a delay offset value, according to an embodiment of the present disclosure.

FIG. 10A is a diagram illustrating an operation of sharing a delay offset value, according to an embodiment of the present disclosure, and illustrates an operation of sharing the delay offset value when a plurality of measuring modules are respectively included in a plurality of terminals respectively corresponding thereto.

Referring to FIG. 10A, each of the plurality of terminals includes a measuring module. The measuring module may correspond to the offset identifying unit 330 of FIG. 3. The plurality of terminals may measure a plurality of delay offset values using the corresponding measuring modules. For example, as illustrated in FIG. 10A, a first terminal 1010 generates first offset information 1017 using a first measuring module 1015, a second terminal 1020 generates second offset information 1027 using a second measuring module 1025, and a third terminal 1030 generates third offset information 1037 using a third measuring module 1035. The plurality of terminals may generate the delay offset information using a delay measuring method that uses the calculation of a cross-correlation of two signals, a delay measuring method that uses an ACLR, or a measuring method that combines the two methods. Each piece of the generated multiple pieces of offset information may be transmitted to a database 1040. The database 1040 may be a database server that the plurality of terminals may access through a network.

The plurality of terminals and the database 1040 may share the delay offset values through a wired or wireless communication scheme. For example, the plurality of terminals may share the delay offset values through worldwide interoperability for microwave access (WiMAX), Bluetooth (BT), BT low energy (BLE), WiFi direct, infrared (IR) communication, Zigbee, Z-Wave, visible light communication (VLC), $3^{rd}$ generation (3G), device-to-device (D2D) of LTE, and the like.

According to an embodiment of the present disclosure, when the first terminal 1010 is a "representative terminal", only the first offset information 1017 is transmitted from the database 1040 to the other terminals, and the second offset information 1027 and the third offset information 1037 are be transmitted to the other terminals.

According to another embodiment of the present disclosure, when a reference channel is set in advance among the plurality of terminals, the database 1040 does not need to provide information associated with the reference channel. However, when the reference channel is not set in advance among the plurality of terminals, the database 1040 may provide the second terminal 1020 and the third terminal 1030 with information associated with the reference channel determined by the first terminal 1010.

According to another embodiment of the present disclosure, when the plurality of terminals subscribe to a communication service and are connected to a communication network, each of the plurality of terminals may periodically measure a delay value between two signal paths. Also, each of the plurality of terminals may measure a delay value between two signal paths during an idle mode or a standby mode.

Figure 10B:
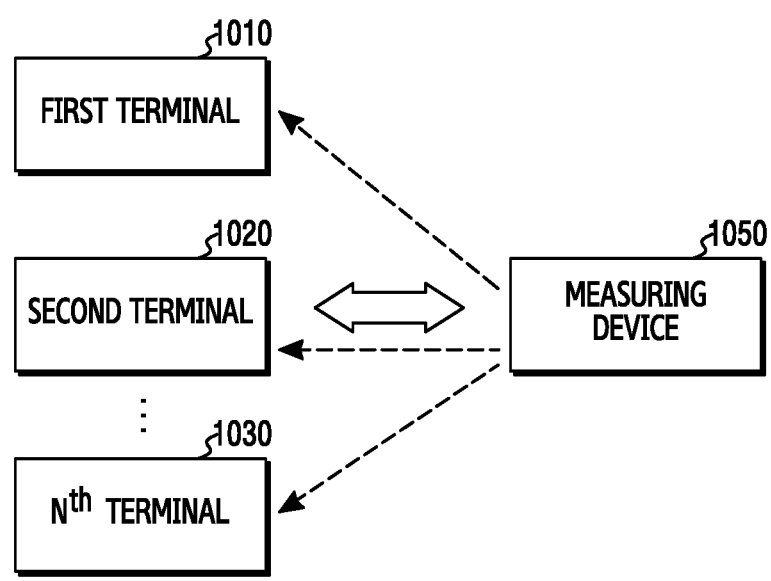
FIG. 10B is a diagram illustrating an operation of sharing a delay offset value, according to another embodiment of the present disclosure.

FIG. 10B is a diagram illustrating an operation of sharing a delay offset value, according to another embodiment of the present disclosure, and illustrates an operation in which a plurality of terminals share delay offset values using a single measuring module.

Referring to FIG. 10B, the plurality of terminals do not include a separate measuring device. A delay value between two signal paths and a delay offset value of each channel may be measured by a measuring device 1050 that is installed outside the plurality of terminals. The measuring device 1050 and each of the plurality of terminals are connected through separate interfaces.

The plurality of terminals and the measuring device 1050 may share the delay offset values through a wired or wireless communication scheme. For example, the plurality of terminals may share the delay offset values through WiMAX, BT, BLE, WiFi direct, IR communication, Zigbee, Z-Wave, VLC, 3G, D2D of LTE, and the like.

According to an embodiment of the present disclosure, the measuring device 1050 receives signals corresponding to combinations of a plurality of channels and a plurality of bandwidths, from the first terminal 1010, and identifies a delay value between two signal paths with respect to each channel and each bandwidth, based on the received signals. Also, a delay offset value with respect to a delay value of the reference channel may be identified based on the each identified delay value. The measuring device 1050 transmits the delay value of the determined reference channel and information associated with delay offset values to the plurality of terminals. Each of the plurality of terminals may calibrate a delay between two signal paths with respect to each channel and each bandwidth, based on the delay value of the reference channel and the delay offset value, which are received.

Figure 11:
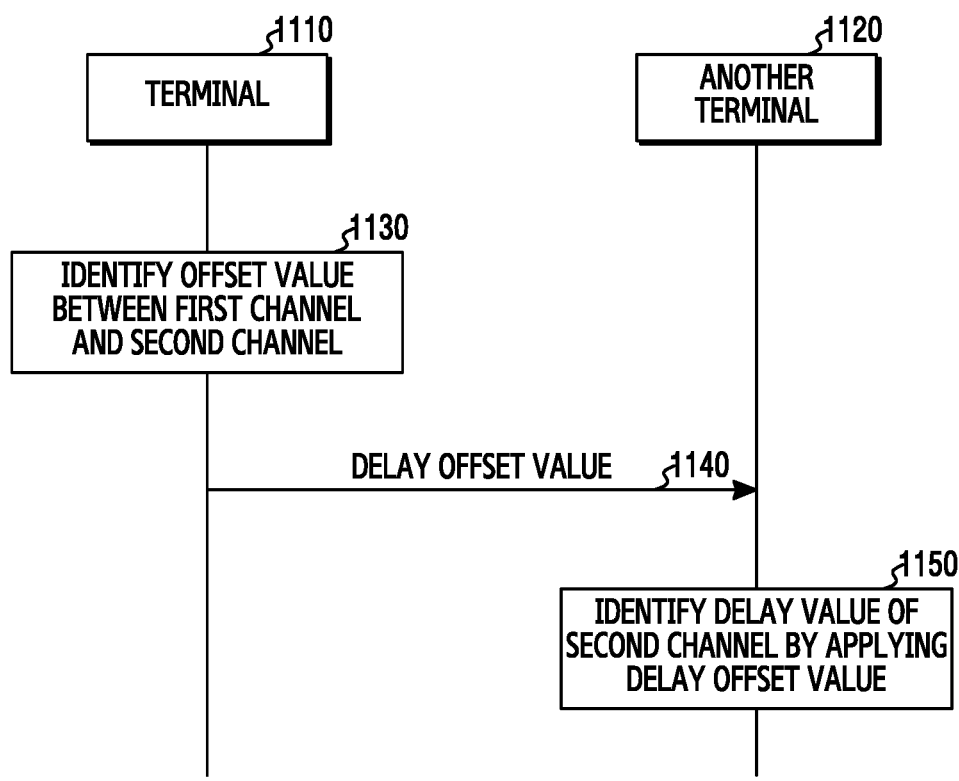
FIG. 11 is a diagram illustrating a signal flow for sharing a delay offset value, according to an embodiment of the present disclosure.

FIG. 11 is a diagram illustrating a signal flow for sharing a delay offset value, according to an embodiment of the present disclosure.

Although FIG. 11 illustrates the operations of one terminal that provides the delay offset value and the operations of another terminal that uses the delay offset value, the operations of at least two terminals that provide at least two delay offset values and the operations of at least two other terminals that use the at least two delay offset values may be performed according to various embodiments of the present disclosure.

Referring to FIG. 11, in step 1130, a terminal 1110 identifies a delay offset value between the first channel and the second channel. The delay offset value indicates a difference in the delay values associated with two signal paths, between the first channel and the second channel. Although FIG. 11 illustrates an operation in which the terminal 1110 autonomously identifies the delay offset value, a separate measuring device may identify the delay offset value. The terminal 1110 may store the identified delay offset value in a storage unit in the terminal 1110.

In step 1140, the terminal 1110 transmits the delay offset value to another terminal 1120. Although FIG. 11 illustrates that the terminal 1110 directly transmits the delay offset value to the other terminal 1120, the terminal 1110 may transmit the delay offset value to the other terminal 1120 through a separate database server. Also, the other terminal 1120 may receive the delay offset value from a separate measuring device, based on an embodying method.

In step 1150, the other terminal 1120 identifies a delay value between two signal paths with respect to the second channel of the other terminal 1120 by applying the received delay offset value. Here, the second channel indicates a channel that is different from the reference channel. That is, the other terminal 1120 identifies a delay value between two signal paths with respect to the reference channel, which is measured by the other terminal 1120, and identifies the delay value between two signal paths with respect to the second channel by applying the received delay offset value to the identified delay value.

Figure 12:
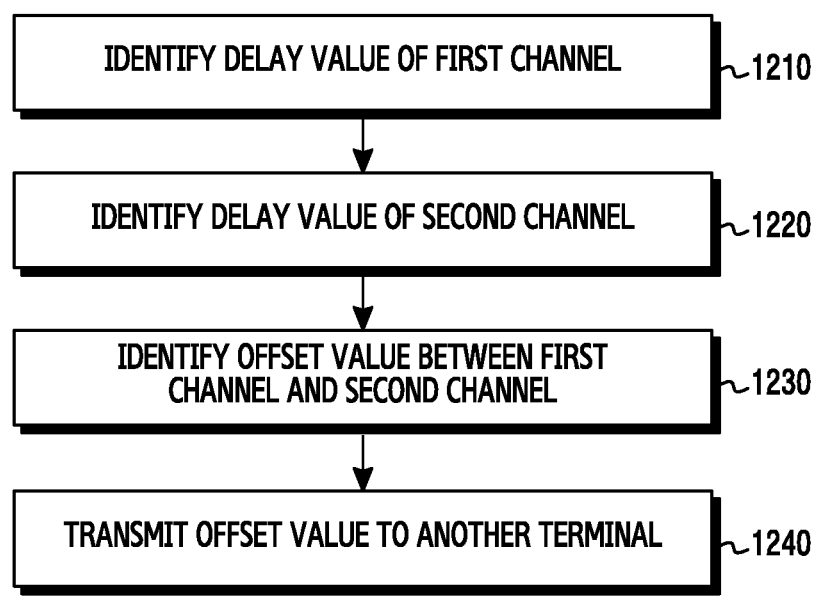
FIG. 12 is a flowchart illustrating operations of a terminal to share a delay offset value, according to an embodiment of the present disclosure.

FIG. 12 is a flowchart illustrating operations of a terminal to share a delay offset value, according to an embodiment of the present disclosure. A series of operations illustrated in FIG. 12 correspond to the operations of the terminal 1110 of FIG. 11.

Referring to FIG. 12, in step 1210, the terminal 1110 identifies a delay value between two signal paths of the first channel. Here, the first channel indicates a reference channel. The delay value between two signal paths may be identified through methods described in detail above. For example, the delay value between two signal paths may be identified based on the calculation of a cross-correlation between the duration time value of a first signal path and the duration time value of a second signal path. In another example, the delay value between two signal paths may be identified based on an ACLR.

In step 1220, the terminal 1110 identifies a delay value between two signal paths of the second channel. Here, the second channel indicates a channel that is different from the reference channel. Also, the second channel indicates a channel including an EARFCN that is identical to the first channel and of a different bandwidth. Although FIG. 12 illustrates that step 1210 and step 1220 are performed in a specified order, the operations may be performed in parallel, or the delay value between two signal paths with respect to the second channel may be identified first.

In step 1230, the terminal 1110 identifies a delay offset value based on the identified delay value between two signal paths of the first channel and the identified delay value between two signal paths of the second channel. Here, the delay offset value indicates a difference in the delay values associated with two signal paths, between the first channel and the second channel. The terminal 1110 may also identify a delay offset value between other channels, in addition to the first channel and the second channel.

In step 1240, the terminal 1110 transmits the identified delay offset value to the other terminal 1120. The terminal 1110 may transmit the identified delay offset value to the other terminal 1120 through a separate database server, or may directly transmit the identified delay offset value to the other terminal 1120.

Figure 13:
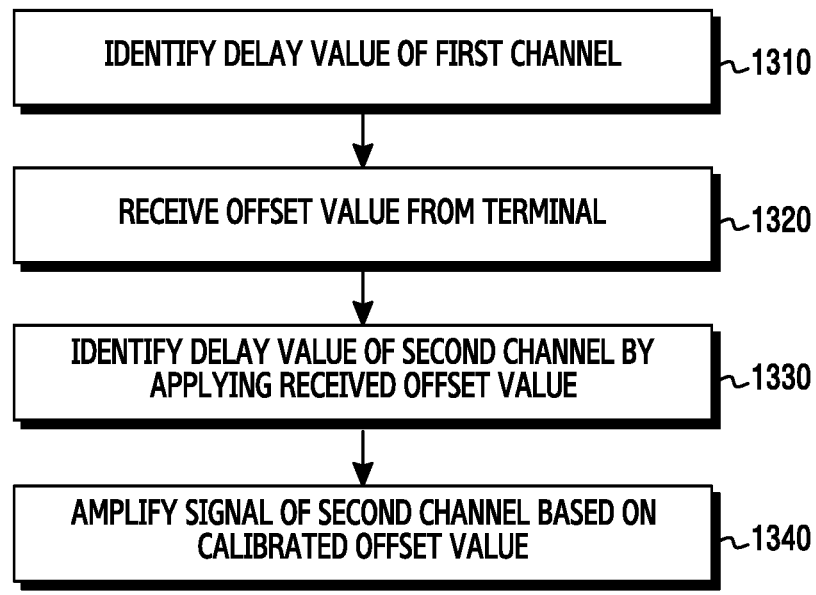
FIG. 13 is a flowchart illustrating operations of a terminal to share an offset value, according to another embodiment of the present disclosure.

FIG. 13 is a flowchart illustrating operations of another terminal to share an offset value, according to an embodiment of the present disclosure. A series of operations illustrated in FIG. 13 correspond to the operations of the other terminal 1120 of FIG. 11.

Referring to FIG. 13, in step 1310, the other terminal 1120 identifies a delay value between two signal paths of the first channel (i.e., a reference channel). Here, the first channel may be determined in advance by the terminal 1110 and the other terminal 1120. Also, the first channel may be determined by a separate communication network server, such as the database server. The other terminal 1120 may identify the delay value through a measuring method that uses the calculation of a cross-correlation or a measuring method that uses an ACLR.

In step 1320, the other terminal 1120 receives the delay offset value from the terminal 1110 or the database server. Here, the delay offset value indicates a delay offset value with respect to the first channel and the second channel. Although FIG. 13 illustrates that steps 1310 and 1320 are performed in a specified order, the operations may be performed in parallel or the other terminal 1120 may receive the delay offset value first.

In step 1330, the other terminal 1120 identifies a delay value between two signal paths of the second channel by applying the received delay offset value. Through the above process, the other terminal 1120 consumes a smaller amount of time than the amount of time required for directly measuring the delay value between the two signal paths of the second channel.

In step 1340, the other terminal 1120 calibrates the delay value of the second channel measured based on the delay offset value. Specifically, the other terminal 1120 may calibrate the delay between a first signal path and a second signal path associated with the second channel, so as to synchronize timing associated with a processing time between an input signal of a power amplifier and an envelope signal corresponding to the input signal. Based on the synchronized timing, the other terminal 1120 performs ET with respect to a signal corresponding to the second channel, and may output a signal amplified by the ET technology.

Methods described herein may be implemented by hardware, software, or a combination of hardware and software.

Such software may be stored in a computer readable storage medium. The computer readable storage medium may store at least one program (software module), that includes instructions, which enable an electronic device to perform the method of the present disclosure when the at least one program (software module) is executed by at least one processor in the electronic device.

Such software may be stored in the form of a volatile or a non-volatile storage device, such as ROM; in the form of a memory, such as a RAM, memory chips, or integrated circuits; or in an optical or magnetic readable medium, such as a compact disc-ROM (CD-ROM), a digital versatile disc (DVD), a magnetic disk, a magnetic tape, and the like.

Storage devices and storage media are examples of a machine-readable storage units that are appropriate for storing a program or programs including instructions that implement an embodiment when the instructions are executed. The embodiments provide a program including a code for implementing a method and an apparatus as described herein, and a machine readable storage media that stores the program. In addition, such programs may be electronically transferred by a medium such as a communication signal that is transferred through a wired or wireless communication, and the embodiments may appropriately include equivalents thereof.

In the above-described embodiments of the present disclosure, a component included in the present disclosure is expressed in the singular form or the plural form according to a presented embodiment. However, the singular form or the plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and detail may be made therein without departing from the spirit and scope of the present disclosure as defined by the appended claims.

What is claimed is:

1. An operation method of a first terminal, the method comprising:
   determining, by the first terminal, a delay offset value based on a first delay value of a first channel between the first terminal and an entity, and a second delay value of a second channel between the first terminal and the entity; and
   transmitting the delay offset value from the first terminal, to a second terminal,
   wherein the delay offset value is used to determine a third delay value of a third channel between the second terminal and the entity based on a fourth delay value of a fourth channel between the second terminal and the entity, and
   wherein the fourth delay value is determined by the second terminal.

2. The method of claim 1, wherein each of the first delay value and the second delay value is determined based on a processing time value of a corresponding radio frequency (RF) signal of each of the first channel and the second channel, and a processing time value of an envelope signal detected from the RF signal.

3. The method of claim 1, wherein the delay offset value is determined by a difference between the first delay value and the second delay value,
   wherein each of the first delay value and the second delay value is determined based on a calculation of a cross-correlation between a processing time value of a corresponding RF signal of each of the first channel and the second channel and a processing time value of an envelope signal detected from the RF signal,
   wherein the processing time value of the RF signal is determined based on an input signal and an output signal for processing the RF signal, and
   wherein the processing time value of the envelope signal is determined based on an input signal and an output signal for processing the envelope signal.

4. The method of claim 1, wherein the delay offset value is determined by a difference between the first delay value and the second delay value,
   wherein each of the first delay value and the second delay value is determined from of a plurality of candidate delay values that respectively correspond to a plurality of adjacent channel leakage ratio (ACLR) values with respect to each of the first channel and the second channel, and
   wherein each of the first delay value and the second delay value is determined based on a delay value having the maximum ACLR value out of the plurality of candidate delay values.

5. The method of claim 1, further comprising determining the first channel based on a band, a channel, and a bandwidth for communication between the first terminal and the entity.

6. The method of claim 1, further comprising transmitting, to the second terminal, a second delay offset value determined based on a fifth delay value associated with a first bandwidth of the first channel and a sixth delay value associated with a second bandwidth of the first channel,
   wherein the second delay offset value is used when the second terminal determines a seventh delay value associated with a third bandwidth of the fourth channel, based on an eighth delay value associated with a fourth bandwidth of the fourth channel.

7. The method of claim 1, wherein the third delay value is used to calibrate a delay between processing of an RF signal corresponding to the third channel and processing of an envelope signal detected from the RF signal corresponding to the third channel, and
   wherein the calibrated delay value is used to amplify a signal corresponding to the third channel.

8. The method of claim 1, further comprising transmitting the delay offset value to a server,
   wherein the delay offset value is used to determine channel delay values of a plurality of other terminals.

9. An operation method of a first terminal, the method comprising:
   determining, by the first terminal, a first delay value of a first channel between the first terminal and an entity;
   receiving a delay offset value at the first terminal, from a second terminal; and
   determining a second delay value of a second channel between the first terminal and the entity, based on the delay offset value and the first delay value,
   wherein the delay offset value is determined based on a third delay value of a third channel between the second terminal and the entity and a fourth delay value of a fourth channel between the second terminal and the entity.

10. The method of claim 9, wherein the first delay value is determined based on a processing time value of a radio frequency (RF) signal corresponding to the first channel and a processing time value of an envelope signal detected from the RF signal.

11. The method of claim 9, wherein the first delay value is determined based on a calculation of a cross-correlation between a processing time value of an RF signal corresponding to the first channel and a processing time value of an envelope signal detected from the RF signal,
wherein the processing time value of the RF signal is determined based on an input signal and an output signal for processing the RF signal, and
wherein the processing time value of the envelope signal is determined based on an input signal and an output signal for processing the envelope signal.

12. The method of claim 9, wherein the first delay value is determined out of a plurality of candidate delay values that respectively correspond to a plurality of adjacent channel leakage ratio (ACLR) values with respect to the first channel, and
wherein the first delay value is determined based on a delay value having the maximum ACLR value out of the plurality of candidate delay values.

13. The method of claim 9, further comprising determining the first channel based on a band, a channel, and a bandwidth for communication between the first terminal and the entity.

14. The method of claim 9, further comprising determining a fifth delay value associated with a first bandwidth of the first channel, based on a second delay offset value received from the second terminal and a sixth delay value associated with a second bandwidth of the first channel,
wherein the second delay offset value is determined based on a seventh delay value associated with a third bandwidth of the third channel and an eighth delay value associated with a fourth bandwidth of the third channel.

15. The method of claim 9, further comprising:
calibrating a delay between processing of an RF signal corresponding to the second channel and processing of an envelope signal detected from the RF signal corresponding to the second channel, based on the second delay value; and
amplifying a signal corresponding to the second channel, based on the calibrated delay value.

16. The method of claim 9, further comprising receiving the delay offset value from a server,
wherein the delay offset value is used to determine second channel delay values of a plurality of other terminals.

17. A terminal apparatus, the apparatus comprising:
a controller configured to determine a delay offset value based on a first delay value of a first channel between a first terminal and an entity, and a second delay value of a second channel between the first terminal and the entity, and to transmit the delay offset value to a second terminal,
wherein the delay offset value is used to determine a third delay value of a third channel between the second terminal and the entity based on a fourth delay value of a fourth channel between the second terminal and the entity, and
wherein the fourth delay value is determined by the second terminal.

18. The apparatus of claim 17, wherein each of the first delay value and the second delay value is determined based on a processing time value of a corresponding radio frequency (RF) signal of each of the first channel and the second channel and a processing time value of an envelope signal detected from the RF signal.

19. The apparatus of claim 17, wherein the delay offset value is determined by a difference between the first delay value and the second delay value,
wherein each of the first delay value and the second delay value is determined based on a calculation of a cross-correlation between a processing time value of a corresponding RF signal of each of the first channel and the second channel and a processing time value of an envelope signal detected from the RF signal,
wherein the processing time value of the RF signal is determined based on an input signal and an output signal for processing the RF signal, and
wherein the processing time value of the envelope signal is determined based on an input signal and an output signal for processing the envelope signal.

20. The apparatus of claim 17, wherein the delay offset value is determined by a difference between the first delay value and the second delay value,
wherein each of the first delay value and the second delay value is determined from a plurality of candidate delay values that respectively correspond to a plurality of adjacent channel leakage ratio (ACLR) values with respect to each of the first channel and the second channel, and
wherein each of the first delay value and the second delay value is determined based on a delay value having the maximum ACLR value out of the plurality of candidate delay values.

* * * * *